United States Patent [19]

Bacon et al.

[11] 4,268,562

[45] May 19, 1981

[54] LASER RESISTANT CERAMIC COMPOSITE

[75] Inventors: James F. Bacon, Manchester; Karl M. Prewo, Vernon, both of Conn.

[73] Assignee: The United States of America as represented by the Secretary of the Air Force, Washington, D.C.

[21] Appl. No.: 72,734

[22] Filed: Aug. 30, 1979

[51] Int. Cl.³ ............................ B32B 5/12; B29G 5/00
[52] U.S. Cl. ...................................... 428/113; 156/89; 156/180; 156/296; 264/137; 264/332; 428/283; 428/372; 428/432
[58] Field of Search ............... 428/113, 280, 283, 372, 428/539, 902; 264/137, 332; 156/89, 180, 264, 276, 296

[56] References Cited

U.S. PATENT DOCUMENTS

| | | | |
|---|---|---|---|
| 3,031,361 | 4/1962 | Strickland | 343/872 |
| 3,314,070 | 4/1967 | Youngren | 343/708 |
| 3,422,057 | 1/1969 | Schmidt | 343/872 |
| 3,432,859 | 3/1969 | Jordan et al. | 428/116 |
| 3,460,305 | 8/1969 | Long | 428/44 |
| 3,846,798 | 11/1974 | Carl | 343/705 |
| 3,853,688 | 12/1974 | D'Ambrosio | 428/372 |
| 3,865,599 | 2/1975 | Mansmann et al. | 106/65 |
| 3,866,234 | 2/1975 | Gates, Jr. et al. | 343/911 R |
| 3,993,495 | 11/1976 | Galliath et al. | 106/40 R |

OTHER PUBLICATIONS

Bacon, Prewo & Veltri, "Glass Matrix Composite–II–Alumina Reinforced Glass", Proc. 1978 International Conference on Composite Materials, Published Aug. 30, 1978, pp. 753–769.

Mayfield, "Carbon Fiber Replacements Developing", Aviation Week and Space Technology, Published Jan. 22, 1979, pp. 49–52.

*Primary Examiner*—William J. Van Balen
*Attorney, Agent, or Firm*—Joseph E. Rusz; William J. O'Brien

[57] ABSTRACT

A hot pressed, biaxially oriented, alumina fiber reinforced, ceramic composite having alternate layers of parallel running alumina fibers within a glass matrix such that the fibers of one layer are positioned at right angles to the fibers of any adjoining layer.

7 Claims, No Drawings

LASER RESISTANT CERAMIC COMPOSITE

STATEMENT OF GOVERNMENT INTEREST

The invention described herein may be manufactured and used by or for the Government for governmental purposes without the payment of any royalty thereon.

BACKGROUND OF THE INVENTION

This invention relates to a fiber reinforced structural material. In a more specific aspect, this invention concerns itself with a ceramic composite comprised of high strength alumina fibers in a glass matrix.

The present interest in the utilization of lasers has created a need for structural materials that are especially resistant to the degradation and damage resulting to structural entities when exposed to laser energy. These materials must also possess structural strength and stability in conjunction with a high temperature operating capability.

Fiber reinforced organic matrix composites are widely used and accepted as structural materials because of their desirable attributes of high strength, high moduli and low density. In general, most of these composites possess an organic polymer matrix, such as an epoxy resin, a polyimide, a polycarbonate or similar material. The matrices are reinforced with a great variety of fibers including glass, carbon, graphite and boron. However, even the best of these materials are limited to an operational temperature environment below 300° F. The substitution of a metallic material, such as aluminum for the organic matrix, extends the operational temperature range only slightly. The need for a composite structural material, therefore, that possesses a high temperature operational capability in conjunction with resistance to laser damage, therefore, becomes obviously when one perceives the tremendous strains and stresses encountered by structural materials used in modern day high speed aircraft and missiles.

The utilization of a glass composition for producing fiber reinforced glass composites is disclosed in U.S. Pat. No. 3,607,608 to Siefert wherein the fibers are produced by pulling the fibers through a molten glass bath and then through a constricting orifice. The resulting composites exhibit high strength and no loss in properties after exposure to 540° C. for 100 hour. Siefert, in U.S. Pat. No. 3,792,955, also discloses glass composites with molybdenum, tungsten and boron as the reinforcing fiber component. These fibers also show stability after exposure to a temperature of 540° C. for 100 hours. These materials, however, do not disclose a high resistance to laser damage nor are they known to be capable of operating in a temperature environment of from 600° to 1100° C. in the same manner as the all ceramic, alumina and glass, composite system of this invention.

SUMMARY OF THE INVENTION

In accordance with this invention, it has been found that an alumina fiber reinforced ceramic composite material possesses a high degree of structural and elevated temperature strength and stability in addition to a high degree of resistance to the degradative effects of laser energy. These composites are not limited to an operational temperature environment of less than 300° C. as are the organic matrix composites utilized heretofore. By contrast, the ceramic composites of this invention can be used at intermediate to high temperatures.

An alumina fiber reinforced borosilicate glass, for example, forms a composite useful at temperature up to 600° C. In a further embodiment, if the alumina fibers are placed in a low-expansion glass matrix of fused silica, the resulting composite can be used within a temperature environment as high as 1100° C. Since the all ceramic composites of this invention are comprised of low dielectric materials, they have been found to be especially useful as structural materials in the fabrication of radomes where metallic matrices and fibers, because of their electrically conducting nature, cannot be considered. The composites can be formed with the fibers arranged uniaxially with each layer of material having fibers running in one direction, or, in the alternative, the fibers can be arranged biaxially in that every other layer of alumina fiber and its glass matrix is laid at right angles to the previous layer, thus forming a 0°, 90° biaxial composite of alumina in glass.

Accordingly, the primary object of this invention is to provide a ceramic composite material that possesses a structural strength and stability, high moduli, low density, a high temperature operational capability and a high degree of resistance to the degradative effects of laser energy.

Another object of this invention is to provide a ceramic composite material reinforced by alumina fibers.

Still another object of this invention is to provide an all ceramic, fiber reinforced composite structural material possessing an overall low dielectric constant that renders it especially suitable for use in applications such as radomes where metallic fibers and matrices cannot be used because of their high electrical conductivity.

The above and still other objects and advantages will become more readily apparent upon consideration of the following detailed description thereof.

DESCRIPTION OF THE PREFERRED EMBODIMENT

Pursuant to the above-defined objects, this invention contemplates the fabrication of an alumina fiber reinforced, ceramic composite material. The concept of this invention was conceived, at least in part, with the availability of alumina fibers in two forms with individual fiber diameters of twenty microns, a reasonably high strength high elastic modulus and readily available at low cost. Calculations of the microstresses in the alumina-fiber reinforced glass matrix of this invention as the composite is thermally cycled indicate that the structural integrity of the composite is maintained even after repeated heating to temperatures of about 1000° C. or higher for alumina fibers in a fused silica glass matrix and temperatures of about 600° C. for alumina fibers in a borosilicate glass matrix. Several methods of fabricating the alumina fiber-glass matrix composite may be utilized. However, a conventional slurry method such as disclosed in U.S. Pat. No. 3,607,608 to Siefert has proven to be suitable. More specifically, the material of the invention is made by pulling alumina fibers through a slurry of glass. The coated fiber is wound in a monolayer on a drum, dried, and then cut into a convenient shape such as a square 3 1/16" on a side. The composite is then fabricated by laying a series of squares between layers of finely powdered glass. Preferably, every other layer of coated alumina fiber is laid at right angles to the preceeding layer so that a 0°, 90° biaxial composite of alumina fiber in glass results. The die is then closed with a plunger and the composite formed by hot pressing in vacuum at temperatures of about 1050° to 1400° C. and pressures of about 1000 to 4000 psi for a period of about one hour.

The unexpected superiority of the composites of this invention is unexpected for two reasons. First, it is far superior in resistance to laser damage to those composites involving alumina fiber in alumina and to the slipcast or fused silica discs. Second, it is superior even to combinations of powdered alumina and powdered boron nitride, which likewise have been made into composites by hot pressing, and whose heats of sublimation are larger than the heats of sublimation of the composites of this invention. Yet, this is contrary to all theoretical predictions which state that materials with the highest heats of sublimation should show the most resistance to laser damage.

It is noted at this time, that the individual fibers in each layer of the composite can be laid down to run all in one direction in a uniaxial arrangement. However, the biaxial arrangment, in which the fibers in alternate layers of the composite run perpendicular to the preceeding layer to give a 0°, 90° biaxial composite, has proven to be superior.

The uniaxial alumina fiber reinforced glass matrix composites are characterized by a flexural strength six times that of impregnated slip-cast fused silica, a low dielectric constant and loss tangent, an increased flexural strength as the temperature is increased up to the annealing point of the glass employed as the matrix, and excellent environmental stability. However, such samples are not suitable for laser hardening tests since they are uniaxial rather than biaxial composites.

The biaxially reinforced alumina fiber specimens are primarily fabricated with fused silica as the matrix material. To aid in the fabrication of these alumina fiber reinforced fused silica composites, 5% by weight of Pyrex glass is intentionally added to the fused silica to form a liquid sintering aid that permits fuller consolidation of those compositions at temperatures lower than those normally used to form silica objects. Pyrex is a borosilicate glass and is the registered trademark of the Corning Glass Works, Corning, New York.

The biaxial composites of this invention have proven to have a greater degree of resistance to damage by laser radiation than any of the existing radome materials or any of the materials seriously proposed heretofore for radome use. Also, the biaxial composites showed a very low thermal conductivity (about the same as that of fused silica), an excellent thermal shock resistance, a high environmental stability, and had a coefficient of expansion below that of many common refractories although greater than that of fused silica. The composite also displayed acceptable resistance to rain erosion as measured in high speed sled tests making them especially suitable for use as a structural material in the production of radomes. This is particularly so since the increased strength of this new ceramic composite permits its use as the inner and outer layers of a sandwhich radome construction, thus providing appreciable weight reduction.

Alumina fiber have been available for several years. They have been of particular interest for application in metal matrix composites because of their excellent strength and modulus, especially at high temperature. The two principal types of alumina fiber had been, however, the large diameter ($>250\mu$) single crystal rods or alumina whiskers. The problems of handling and processing of whiskers and the very high cost of the single crystal fiber dampened the enthusiasm for their use in composites. This situation suddenly changed, however, with the advent of high quality alumina yarns which, because of their low potential cost and attractive mechanical properties, could be seriously considered for use in composites. In general, these fibers are produced by E. I. DuPont de Nemours, Inc., 3M Corporation and in the USA and Sumitomo Chemicals Co., Japan.

The DuPont fiber, referred to as fiber FP, is a round cross section, 20 $\mu$m diameter, continuous length yarn haveing 210 fibers per tow. It is available in two forms. Type I is pure alpha alumina while Type II is similar but coated with a thin layer of glass. Type II was originally intended for resin matrix composites and Type I for metal matrix composites; however, it was found by this invention that both are suitable for ceramic composites. Although the initial fiber strength is not particularly high, on the order of 1380 MPa (200,000 psi), it is very important to note that this strength is stable and not affected by handling and is not much different from that realized in composites reinforced with alumina rods of initially higher unhandled "pristine" strength.

The Sumitomo Chemicals fiber are also produced in yarn form; however, there the similarity with fiber FP ends. This fiber is not pure alumina and in fact, it is the presence of some $SiO_2$ and a very fine structure which permit a claimed use temperature to be 1350 ° C. At present the fiber is approximately 11 cm in diameter, 10 cm in length and 50 fibers per tow.

On the basis of specific mechanical properties this fiber is extremely attractive. Its low density and high tensile strength provide a specific strength nearly twice that of fiber FP while the specific modulus approximately equals the FP property. The Sumitomo fiber appears to have superior handleability.

To make the alumina reinforced glass matrix of this invention, any of a large number of glasses may be used. Primarily, the glass component should have a lower coefficient of expansion than the alumina fiber so that in the alumina fiber reinforced glass matrix composite, the glass member will be in compression, thus taking advantage of the great strength glass shows in a compression. Therefore, any of the eight glasses listed in Table I, as well as others, may be used for the glass matrix. Table I discloses the physical characteristics of the glasses suitable for this invention. For example, as shown hereinafter, even the low expansion of fused silica can be tolerated under the thermal stresses expected to be encountered. On the other hand, "S" glass or UTRC glass 417 are more nearly equal to the alumina fiber in thermal expansion and should, therefore, be more nearly optimum for this application.

The glass chosen must have a suitable dielectric constant if it is to be used for radome application and, on this basis, the Corning ultra low expansion glass, fused silica, Vycor*, and "S" glass are outstanding. In addition, the glass chosen must be as resistant as possible to laser damage.

As discussed earlier, several methods exist for the construction of a fiber reinforced glass composite. However, the simplest and lowest cost method consists of pulling the fiber tow through a slurry containing finely ground glass particles. To be more specific, the material is made by pulling a tow of DuPont alumina fiber type FP through a slurry of 85 grams of Corning 7940 (fused silica) glass and 4.25 grams of Corning 7740 (Pyrex) glass in 200 grams (260 ml) of isopropyl alcohol, 10 grams of polyvinyl alcohol and 5 drops of Tergitol+s H.P. 27. The coated fiber is wound in a monolayer on a drum, dried, and cut into strips or into squares 3 1/16" on a side; placed in a metal die to give unidirectional or cross-piled fiber alignment and then hot pressed. Preferably the composite is fabricated by laying the squares between layers of finely powdered glass (each layer of glass is 0.277 grams in a graphite die). Every other layer of coated alumina fiber is laid at right angles to the preceeding layer so that a 0°, 90° biaxial composite of alumina fiber in glass results. The die is then closed with a plunger and the composite formed by hot pressing in vacuum at temperatures of 1344° to 1360° C. and 2000 psi pressure for a period of about one hour. The addition of the 4.25 grams of Pyrex glass allows the hot pressing of the composite at a temperature noninjurious to the alumina fiber by inducing liquid phase sintering.

The hot pressing may be carried out in a vacuum using metal dies coated with colloidal boron nitride at pressures of 2000 to 3000 psi and temperatures of 1050° to 1200° C. for the common borosilicate glass. Alternately, the hot pressing may be done in argon using graphite dies sprayed with boron nitride powder, a pressure of about 1000 to 4000 psi, and a temperature of about 1400° C. for the ultra-low expansion fused silica glass.

The procedure for assembling the alumina fiber reinforced glass matrix composite consists of a number of processes each with its own variables. In making the glass coated alumina fiber tape, the speed with which the fiber moves through the slurry, the amount of glass in the slurry, the organic constituents of the slurry and their proportions can all be varied. In cutting the tape and stacking it into the die, the amount of additional glass introduced between each layer and the number of layers must be determined experimentally. In the hot pressing operation, the temperature(s) for outgassing, the hot pressing temperature, pressure, atmosphere and dwell time, and finally the temperature to which the die is cooled before the pressure is released must all be decided upon. And, of course, the types of alumina fiber and glass used are of the greatest importance. The following information and test results discloses the effects of these variables on the composite's strength. It is the purpose of the following information to examine the effect on the achieved mechanical strength of six of these variables. Also, a similar examination of the effects of variables on the achieved dielectric constant and loss tangent of the composite is also in order.

In Table II, which discloses the effects of the amount of glass, the data for samples made with 85 grams of glass and 170 grams of glass in the slurry are shown. It appears there is no net effect on the three-point flexural strength of the samples as the amount of the glass in the slurry is varied. If any such effect exists, it would seem that the greater amount of glass in the slurry tends to decrease the amount of scatter in the strength values. It was decided to standardize, therefore, on 85 grams of glass in 200 grams of isopropyl alcohol, 10 grams of polyvinyl alcohol, and 5 drops of a Tergitol's wetting agent since vigorous stirring could keep this amount of glass in suspension and this standard provided optimum results.

In Table III the strength of a composite hot pressed in an atmosphere of argon is compared with one hot pressed in a good vacuum. Here the results are virtually identical showing that the only effect of the atmosphere is to allow hot pressing at 50° C. lower temperature in argon than in vacuum.

Table IV compares two composites hot pressed at pressures of 2000 psi and 4000 psi. It will be noted that doubling the pressure used used to hot press produces approximately a 12% increase in achieved mechanical strength. However, since this increase in strength can be more readily accomplished by increasing the temperature, and because any pressure above 4000 psi on the size sample produced, necessitated the use of a much stronger fiber wound reinforced graphite die, 2000 psi hot pressing pressure was selected as a standard.

TABLE I

Physical Characteristics of Several Glasses Considered for Alumina Fiber Reinforced Glass Matrix

| Material | Density gms/cm$^3$ | Coeff of Linear Exp $10^{-7}$ per °C. | Dielectric Constant | Modulus $10^6$ psi | Specific Modulus $10^7$ in. | Strength $10^3$ psi | Specific Strength $10^6$ in. | Temperature of Extreme Use °C. |
|---|---|---|---|---|---|---|---|---|
| Corning 7971 Ultra low exp. glass | 2.205 | −0.3 | 4.00 | 6.9 | | | | 1100 |
| Corning 7940 Fused silica | 2.205 | 3.9 | 4.00 | 7.4 | | | | 1100 |
| Corning 7913 Vycor | 2.18 | 5.5 | 3.8 | 6.9 | | | | 1200 |
| Corning 7740 Borosilicate glass | 2.23 | 32.5 | 4.6 | 6.4 | | | | 600 |
| "E" glass | 2.54 | 29 | 6.05 | 10.5 | 11.4 | 530 fiber | 5.77 | 600 |
| Corning 1723 Alumina silicate glass | 2.64 | 46 | 6.3 | 8.9 | | | | 800 |
| UTRC glass Fiber 417 | 3.09 | 51.7 | not known | 18.4 | 16.5 | 772 fiber | 6.92 | 900 |
| "S" glass | 2.48 | 60 | 4.74 | 12.4 | 14.6 | 637 fiber | 7.12 | 800 |
| Alumina Fiber 3M | 2.7 | 63 | not known | 23 | 23.7 | 250 | 2.58 | 1300 |
| Alumina Fiber DuPont | 3.95 | 74 | not known | 50 | 35.0 | 250 | 1.76 | 1000 |
| Boron nitride Fiber-Carborundum | 2.0 | 102 along fiber 6 across | 4+ | 33.8 | 46.8 | 236 | 3.27 | |

TABLE II

Effect of Amount of Glass in Slurry on Mechanical Properties of DuPont Alumina Fiber FP in Glass Matrix Composites

| Specimen | Material Glass | Material Fiber | Hot Pressing Conditions Temp °C. | Hot Pressing Conditions Pressure psi | Hot Pressing Conditions Atmos. | Three Point Flex. Str. psi | Three Point Flex. Str. MPa | Glass Added Between Layers grams | Glass in Slurry grams |
|---|---|---|---|---|---|---|---|---|---|
| LB 49 | Ferro S | DuPont Al₂O₃ | 1050 | 2000 | Argon | 39,200 | 270 | 0.17 | 170 |
| ↓ | ↓ | ↓ | ↓ | ↓ | ↓ | 42,600 | 294 | ↓ | ↓ |
| ↓ | ↓ | ↓ | ↓ | ↓ | ↓ | 49,400 | 341 | ↓ | ↓ |
| ↓ | ↓ | ↓ | ↓ | ↓ | ↓ | 43,400 | 299 | ↓ | ↓ |
| ↓ | ↓ | ↓ | ↓ | ↓ | ↓ | 40,700 | 280 | ↓ | ↓ |
| ↓ | ↓ | ↓ | ↓ | ↓ | ↓ | 40,600 | 280 | ↓ | ↓ |
| Average | | | | | | 42,650 | 295 | | |
| LB 72 | Ferro S | DuPont Al₂O₃ | 1050 | 2000 | Argon | 35,900 | 248 | 0.115 | 85 |
| ↓ | ↓ | ↓ | ↓ | ↓ | ↓ | 36,100 | 249 | ↓ | ↓ |
| ↓ | ↓ | ↓ | ↓ | ↓ | ↓ | 37,600 | 259 | ↓ | ↓ |
| ↓ | ↓ | ↓ | ↓ | ↓ | ↓ | 57,400 | 396 | ↓ | ↓ |
| ↓ | ↓ | ↓ | ↓ | ↓ | ↓ | 49,200 | 340 | ↓ | ↓ |
| ↓ | ↓ | ↓ | ↓ | ↓ | ↓ | 40,700 | 280 | ↓ | ↓ |
| Average | | | | | | 42,820 | 295 | | |

TABLE III

Effect of Hot Pressing Atmosphere on Mechanical Properties of DuPont Alumina Fiber FP in Glass Matrix Composite

| Specimen | Material Glass | Material Fiber | Hot Pressing Conditions Temp. °C. | Hot Pressing Conditions Pressure psi | Hot Pressing Conditions Atmos. | Three Point Flex Str. psi | Three Point Flex Str. MPa | Glass Added Between Layers grams | Glass in Slurry grams |
|---|---|---|---|---|---|---|---|---|---|
| LB 49 | Ferro S | DuPont Al₂O₃ | 1050 | 2000 | Argon | 30,200 | 270 | 0.17 | 170 |
| ↓ | ↓ | ↓ | ↓ | ↓ | ↓ | 42,600 | 294 | ↓ | ↓ |
| ↓ | ↓ | ↓ | ↓ | ↓ | ↓ | 49,400 | 341 | ↓ | ↓ |
| ↓ | ↓ | ↓ | ↓ | ↓ | ↓ | 43,400 | 299 | ↓ | ↓ |
| ↓ | ↓ | ↓ | ↓ | ↓ | ↓ | 40,700 | 280 | ↓ | ↓ |
| ↓ | ↓ | ↓ | ↓ | ↓ | ↓ | 40,600 | 280 | ↓ | ↓ |
| Average | | | | | | 42,650 | 295 | | |
| LB 60 | Ferro S | DuPont Al₂O₃ | 1100 | 2000 | Vacuum | 39,100 | 270 | 0.15 | 170 |
| ↓ | ↓ | ↓ | ↓ | ↓ | ↓ | 41,700 | 288 | ↓ | ↓ |
| ↓ | ↓ | ↓ | ↓ | ↓ | ↓ | 43,100 | 297 | ↓ | ↓ |
| ↓ | ↓ | ↓ | ↓ | ↓ | ↓ | 48,600 | 335 | ↓ | ↓ |
| ↓ | ↓ | ↓ | ↓ | ↓ | ↓ | 36,500 | 251 | ↓ | ↓ |
| ↓ | ↓ | ↓ | ↓ | ↓ | ↓ | 40,700 | 281 | ↓ | ↓ |
| Average | | | | | | 41,600 | 287 | | |

TABLE IV

Effect of Hot Pressing Pressure on Mechanical Properties Of DuPont Alumina Fiber FP in Glass Matrix Composites

| Specimen | Material Glass | Material Fiber | Hot Pressing Conditions Temp °C. | Hot Pressing Conditions Pressure psi | Hot Pressing Conditions Atmos. | Three Point Flex. Str. psi | Three Point Flex. Str. MPa | Glass Added Between Layers grams | Glass in Slurry grams |
|---|---|---|---|---|---|---|---|---|---|
| LB 71 | Ferro S | FP Al₂O₃ | 1100 | 2000 | Argon | 37,000 | 255 | 0.115 | 85 |
| ↓ | ↓ | ↓ | ↓ | ↓ | ↓ | 34,800 | 240 | ↓ | ↓ |
| ↓ | ↓ | ↓ | ↓ | ↓ | ↓ | 33,100 | 228 | ↓ | ↓ |
| ↓ | ↓ | ↓ | ↓ | ↓ | ↓ | 39,800 | 274 | ↓ | ↓ |
| ↓ | ↓ | ↓ | ↓ | ↓ | ↓ | 34,400 | 237 | ↓ | ↓ |
| ↓ | ↓ | ↓ | ↓ | ↓ | ↓ | 32,300 | 223 | ↓ | ↓ |
| Average | | | | | | 35,200 | 243 | | |
| LB 85 | 1723 | FP Al₂O₃ | 1100 | 4000 | Argon | 33,710 | 232 | 0.09 | 85 |
| ↓ | ↓ | ↓ | ↓ | ↓ | ↓ | 38,070 | 263 | ↓ | ↓ |
| ↓ | ↓ | ↓ | ↓ | ↓ | ↓ | 31,930 | 220 | ↓ | ↓ |
| ↓ | ↓ | ↓ | ↓ | ↓ | ↓ | 44,250 | 305 | ↓ | ↓ |
| ↓ | ↓ | ↓ | ↓ | ↓ | ↓ | 34,290 | 237 | ↓ | ↓ |
| ↓ | ↓ | ↓ | ↓ | ↓ | ↓ | 41,400 | 286 | ↓ | ↓ |
| ↓ | ↓ | ↓ | ↓ | ↓ | ↓ | 48,080 | 332 | ↓ | ↓ |
| ↓ | ↓ | ↓ | ↓ | ↓ | ↓ | 50,870 | 351 | ↓ | ↓ |
| ↓ | ↓ | ↓ | ↓ | ↓ | ↓ | 39,190 | 270 | ↓ | ↓ |
| Average | | | | | | 40,200 | 277 | | |

Temperature is another important processing variable. The pronounced effect of a 50° C. variation in temperature on the mechanical strength of the composite is shown in Table V where the data for each set of samples demonstrates that there is an optimum temperature at which to hot press the sample and that temperatures either higher or lower than this optimum temperature result in composites with lower mechanical strength. This optimum temperature is related to the particular viscosity of the glass under consideration. The preferred hot pressing temperature occurs nearly 100° C. below the working point of the glass under a pressure of 2000 lbs/sq in. At this temperature and a pressure of 2000 lbs/sq in., the glassy liquid has sufficient mobility to flow around each fiber of the reinforcing alumina tow. Examination of Table VI emphasizes that the type of glass chosen for the matrix portion of the alumina fiber reinforced glass can have a pronounced effect on the mechanical strength of the resulting composite. All three glasses of Table VI have approximately the same viscosity at the hot pressing temperature. However, the three are quite dissimilar in composition since C.G.W. 1723 is an alumino-silicate glass (approximately 57% $SiO_2$ by weight, 20% $Al_2O_3$), Ferro "S" glass is again an aluminosilicate glass with magnesia added (approximately by weight 65% $SiO_2$, 25% $Al_2O_3$, 10% MgO) while C.G.W. 7740 is a borosilicate glass (approximately 80% $SiO_2$, 14% $B_2O_3$, 2% $Al_2O_3$). Since alumina in glass is known to contribute both to an increase in modulus and strength, it is to be expected that the higher alumina glasses would yield a somewhat stronger composite than the borosilicate glass, and this is what is shown in Table VI. In addition, the bonding between the DuPont alumina fiber and the glass will depend on the composition of the glass matrix, and the results of Table VI are undoubtedly a partial reflection of the varying degree of bonding with the more tightly bonded composite showing a lower strength.

The first biaxial samples produced consisted of composites of approximately 50% (by volume) alumina fiber and 50% Corning Glass Works Code 7740 glass (Pyrex). They were constructed by placing a layer of ground glass in the die, followed by a layer of alumina fiber coated with slurry, then a second layer of ground glass, another layer of slurry coated alumina fiber at right angles to the first alumina fiber layer thus forming a 0°, 90°, biaxial composite. This process was continued to give a total of 60 layers of alumina fiber and 62 layers of glass. The resulting stack was hot pressed in argon in a graphite die at a pressure of 2000 psi and a temperature of 1120° C. for a time of 1 hour.

These medium temperature biaxial composites of alumina fiber in Pyrex glass were used to work out the variables in the process for making such samples. All subsequent biaxial specimens were prepared from a distribution of approximately 50% DuPont alumina fiber, Type FP, in a matrix of fused silica diluted by a 5% C.G.W. 7740 (Pyrex) glass addition. This 5% of lower melting glass is intentionally added both to inhibit devitrification of the fused silica and to form a liquid sintering aid. Composites of this type were prepared by hot pressing at temperatures of 1300° to 1350° C. at a pressure of 2000 psi held for 1 hour in either a vacuum or argon atmosphere. The alumina fiber reinforced fused silica samples when sectioned showed that the alumina fibers have moved greater distances than is the case for the alumina fiber reinforced Pyrex glass matrices and are more likely to have some porosity.

Biaxial samples of the alumina fiber reinforced fused silica (with 5% Pyrex dilution) were tested for thermal conductivity measurements. The results of these measurements are shown in Table VII. As shown, it is evident that the addition of the alumina fibers to the fused silica matrix gives only a slight increase in the thermal conductivity of the fused silica presumably because each alumina fiber is isolated by the fused silica. The alumina fiber reinforced fused silica composite, therefore, has a markedly lower thermal conductivity than other common refractories including alumina.

TABLE VII

Thermal Conductivity of UTRC LB 180 As a Function of Temperature

| Temp. °C. | Watts/M °K. | Cal/cm sec °C. | BTU/in/hr sq ft °F. | BTU/ft hr °F. |
|---|---|---|---|---|
| 50 | 3.0 | 0.0072 | 21 | 1.75 |
| 100 | 2.7 | 0.0065 | | |
| 200 | 2.3 | 0.0055 | 16 | 1.33 |
| 300 | 2.1 | 0.0050 | | |
| 400 | 2.0 | 0.0048 | 14 | 1.167 |
| 500 | 1.9 | 0.0045 | | |
| 600 | 2.0 | 0.0048 | 14 | 1.167 |
| 700 | 2.1 | 0.0050 | | |
| 800 | 2.3 | 0.0055 | 16 | 1.33 |
| 900 | 2.4 | 0.0057 | | |
| 1000 | 2.7 | 0.0064 | 19 | 1.58 | by 418 to get cal/cm sec °C. from Watts/M°K.

TABLE V

Effect of Hot Pressing Temperature on Mechanical Properties of DuPont Alumina Fiber FP in Glass Matrix Composites

| Specimen | Material Glass | Material Fiber | Hot Pressing Conditions Temp. °C. | Hot Pressing Conditions Pressure psi | Hot Pressing Conditions Atmos. | Three Point Flex. Str. psi | Three Point Flex. Str. MPa | Glass Added Between Layers grams | Glass in Slurry grams |
|---|---|---|---|---|---|---|---|---|---|
| LB 70A | Ferro S | DuPont $Al_2O_3$ | 1150 | 2000 | Argon | 26,300 | 181 | 0.115 | 85 |
| 71 | ↓ | ↓ | 1100 | ↓ | ↓ | 35,200 | 243 | ↓ | ↓ |
| 72 | ↓ | ↓ | 1050 | ↓ | ↓ | 42,820 | 295 | ↓ | ↓ |
| 73 | ↓ | ↓ | 1000 | ↓ | ↓ | 33,600 | 232 | ↓ | ↓ |
| 74 | ↓ | ↓ | 950 | ↓ | ↓ | 29,600 | 204 | ↓ | ↓ |
| LB 59 | Ferro S | DuPont $Al_2O_3$ | 1150 | 2000 | Vacuum | 31,200 | 215 | 0.15 | 170 |
| 60 | ↓ | ↓ | 1100 | ↓ | ↓ | 41,600 | 287 | ↓ | ↓ |
| 61 | ↓ | ↓ | 1050 | ↓ | ↓ | 33,350 | 230 | ↓ | ↓ |
| 62 | ↓ | ↓ | 1000 | ↓ | ↓ | 25,000 | 172 | ↓ | ↓ |
| 63 | ↓ | ↓ | 950 | ↓ | ↓ | 14,700 | 101 | ↓ | ↓ |

TABLE VI

Effect of Glass Type of Mechanical Properties of DuPont Alumina Fiber FP in Glass Matrix Composites

| Specimen | Material Glass | Material Fiber | Hot Pressing Conditions Temp. °C. | Hot Pressing Conditions Pressure psi | Hot Pressing Conditions Atmos. | Three Point Flex. Str. psi | Three Point Flex. Str. MPa | Glass Added Between Layers grams | Glass in Slurry grams |
|---|---|---|---|---|---|---|---|---|---|
| LB 42 | 1723 | FP $Al_2O_3$ | 1050 | 2000 | Argon | 43,000 | 296 | 0.3 | 85 |
| | ↓ | ↓ | ↓ | ↓ | ↓ | 42,900 | 296 | ↓ | ↓ |
| | ↓ | ↓ | ↓ | ↓ | ↓ | 41,200 | 284 | ↓ | ↓ |
| | ↓ | ↓ | ↓ | ↓ | ↓ | 48,000 | 331 | ↓ | ↓ |

TABLE VI-continued

Effect of Glass Type of Mechanical Properties of DuPont Alumina Fiber FP in Glass Matrix Composites

| Specimen | Material Glass | Material Fiber | Hot Pressing Conditions Temp. °C. | Hot Pressing Conditions Pressure psi | Hot Pressing Conditions Atmos. | Three Point Flex. Str. psi | Three Point Flex. Str. MPa | Glass Added Between Layers grams | Glass in Slurry grams |
|---|---|---|---|---|---|---|---|---|---|
|  | ↓ | ↓ | ↓ | ↓ | ↓ | 43,400 | 299 | ↓ | ↓ |
|  | ↓ | ↓ | ↓ | ↓ | ↓ | 28,400 | 196 | ↓ | ↓ |
| Average | ↓ | ↓ | ↓ | ↓ | ↓ | 41,150 | 284 | ↓ | ↓ |
| LB 72 | Ferro S | FP Al$_2$O$_3$ | 1050 | 2000 | Argon | 35,900 | 248 | 0.115 | 85 |
|  | ↓ | ↓ | ↓ | ↓ | ↓ | 36,100 | 249 | ↓ | ↓ |
|  | ↓ | ↓ | ↓ | ↓ | ↓ | 37,600 | 259 | ↓ | ↓ |
|  | ↓ | ↓ | ↓ | ↓ | ↓ | 57,400 | 396 | ↓ | ↓ |
|  | ↓ | ↓ | ↓ | ↓ | ↓ | 49,200 | 340 | ↓ | ↓ |
|  | ↓ | ↓ | ↓ | ↓ | ↓ | 40,700 | 280 | ↓ | ↓ |
| Average | ↓ | ↓ | ↓ | ↓ | ↓ | 42,800 | 295 | ↓ | ↓ |
| LB 123 | 7740 | FP Al$_2$O$_3$ | 1100 | 2000 | Argon | 22,800 | 157 | 0.115 | 85 |
|  | ↓ | ↓ | ↓ | ↓ | ↓ | 25,800 | 178 | ↓ | ↓ |
|  | ↓ | ↓ | ↓ | ↓ | ↓ | 32,900 | 227 | ↓ | ↓ |
|  | ↓ | ↓ | ↓ | ↓ | ↓ | 31,800 | 219 | ↓ | ↓ |
|  | ↓ | ↓ | ↓ | ↓ | ↓ | 30,500 | 210 | ↓ | ↓ |
| Average | ↓ | ↓ | ↓ | ↓ | ↓ | 28,800 | 198 | ↓ | ↓ |

Three separate sets of biaxial composites were prepared for laser irradiation studies. The first set, numbers LB 165, 165a, 166, 166a, 167 and 167a consisted of composites consisting approximately of 50% (by volume) DuPont alumina fiber Type FP and 50% Corning Glass Works 7740 or Pyrex glass. The second set of samples, LB 176 to 181 inclusive consisted of 50% DuPont alumina fiber, Type FP. distributed in a matrix of 95% fused silica, C.G.W. 7940, and 5% Pyrex C.G.W. 7740 glass. The third set of samples, LB 182 through 187, was prepared similarly to the second set of samples but contains an addition of boron nitride flakes. In making these samples the slurry through which the DuPont alumina fibers, Type FP, are drawn consists of 85 grams of a mixture whose fractional parts are 100 grams 7940 glass, 5 grams 7740 glass, and 26.25 grams of boron nitride flakes, suspended in 200 grams of isopropyl alcohol and 10 grams of polyvinyl alcohol with the usual drops of wetting agent.

The results of prolonged laser irradiation of the three types of UTRC biaxial alumina fiber-glass composites are shown in Tables VIII and IX. All of these results were obtained using a 15 kilowatt, 12 tube NOL CO$_2$ laser. Table VIII is for irradiation of the samples at an intermediate laser power density and Table IX is for high laser power density. In all cases the laser beam employed had a Gaussian distribution with a peak intensity more than five times the average power density. There are some surprises when one compares the two tables. For example, at an intermediate laser power density, hot pressed silicon nitride performs in an outstanding fashion since the retarded melting gives an opportunity for the infrared reflectivity at the Reststrahlen wavelength to protect the sample while at very high laser intensity the sample both burns through and fractures in a very short time. The biaxially reinforced samples of alumina fiber in pyrex are not better than the Corning Pyroceram 9606 or Corning Pyrex sight glasses; however, the other types of UTRC biaxial composites give outstanding results.

If the data for UTRC samples LB 176, 177, 178 and 179 which are biaxially reinforced alumina fiber in fused silica diluted with 5% Pyrex as a liquid sintering aid are examined, it will be noticed that these materials are superior to all other materials tested. This includes those materials commonly used for missile radomes such as impregnated slip-cast fused silica and Pyroceram 9606 as well as the outstanding new candidate materials for radomes such as the hot pressed alumina-boron nitride composites. Incidentally, all these tests were conducted at the same time.

UTRC samples LB 182 and 183 which represent the third species of UTRC biaxial samples tested, i.e., a 50% concentration of DuPont alumina fibers, type FP, reinforcing a matrix whose constituents are present in the proportions of 100 grams of fused silica, 5 grams of Pyrex (C.G.W. 7740) glass and 26.25 grams of Cerac boron nitride flakes are almost as good as samples LB 176, 177, 178 and 179. Both types of biaxial samples have been given further laser testing including irradiation with a flat topped laser beam to measure recession rates.

Eight additional biaxial fiber reinforced fused silica composites were prepared specifically for irradiation by CO$_2$ lasers (10.6 micron). These specimens were squares 5.715 cm on edge with a nominal one cm thickness. The data characterizing these samples are shown in Table X.

The disposition of these eight biaxial samples is shown in Table X. LB 356 was cracked due to excessive flashing of glass (too loose a die) which made the die so difficult to disassemble that the excessive force was used. LB 358 had a crazed surface because of rapid chilling when the die was removed at too high a temperature from the hot press. Samples LB 351 and LB 352 together with an earlier sled sample LB 349, were tested for laser damage resistance to CO$_2$ laser irradiation using the UTRC 12 tube laser in a high intensity flat-top mode.

The result of the laser damage studies are shown in Table XI. All laser tests were stopped before burn through in order to establish accurate data for linear recession rates and weight loss measurements.

TABLE VIII

Comparative $CO_2$ Laser Resistance of Several Materials at Intermediate Laser Power Densities

| Material | Thickness (inches) | Time to Burn Through or Fracture (seconds) |
|---|---|---|
| Hot Pressed Silicon Nitride* (endurance due to reststrahlen) | 0.23 | 50 |
| Pyroceram, C.G.W. 9606 | 0.250 | 4 |
| Slip cast fused silica, impregnated | 0.125 | 13 |
| Fused silica (transparent) | 0.250 | 45 |
| Pyrex disc (C.G.W. 7740) | 0.123 | 10 |
| 65% dense comp., $Al_2O_3$ fibers in $AL_2O_3$ | 0.30 | 7 |
| 20% $Al_2O_3$-30% BN | 0.222 | fractured 8 to 10 burn thru 33 |
| 60% $Al_2O_3$-40% BN | 0.2635 | early fracture at 8 burn thru 40 |
| UTRC LB 166a, $Al_2O_3$ fibers in 7740 | 0.25 | 1 to 2 |
| UTRC LB 178, $Al_2O_3$ fibers in 95% 7940, 5% in 7740 | 0.35 | pinhole in 50 |
| Second sample 70% $Al_2O_3$-30% BN | 0.3565 | 2 |
| Third sample 70% $Al_2O_3$-30% BN | 0.212 | 2 |

*Note at this lower power density, retarded melting gives a chance for reststrahlen to develop

TABLE IX

Comparative $CO_2$ Laser Resistance of Several Materials at a Higher Laser Power Density

| Material | Thickness (inches) | Time to Burn Through or Fracture (seconds) |
|---|---|---|
| Reaction sintered silicon nitride | 0.19 | 1 |
| Hot pressed silicon nitride | 0.23 | 2 |
| Pyrex disc (C.G.W. 7740) | 0.125 | 1 to 2 |
| Fused silica disc (equivalent to C.G.W. 7940) | 0.1 | 4 |
| Slip-cast fused silica, impregnated | 0.125 | 3 |
| 50% $Al_2O_3$-50% BN* | 0.36 | 10 |
| 50% $Al_2O_3$-40% BN** | 0.22 | 6 |
| 65% dense composite $Al_2O_3$ fiber in $Al_2O_3$ | 0.312 | 5 |
| 75% dense composite $Al_2O_3$ fiber in $Al_2O_3$ | 0.312 | 2 |
| 85% dense composite $Al_2O_3$ fiber in $Al_2O_3$ | 0.312 | 2 |
| 95% dense composite $Al_2O_3$ fiber in $Al_2O_3$ | 0.312 | 1 |
| Pyroceram, C.G.W. 9606 | 0.250 | 1 |
| UTRC LB 165, $Al_2O_3$ fiber in Pyrex glass matrix | 0.250 | 1 |
| UTRC LB 176, $Al_2O_3$ fiber in 7940 (fused silica) + 5% Pyrex matrix | 0.35 | 11(not quite BT |
| UTRC LB 177, $Al_2O_3$ fiber in fused silica (7940) + 5% Pyrex matrix | 0.35 | 9 |
| UTRC LB 179, $Al_2O_3$ fiber in fused silica (7940) + 5% Pyrex matrix | 0.44 | over 10 |
| UTRC LB 182, $Al_2O_3$ fiber in fused silica + 5% Pyrex + 25% BN | 0.42 | 8 |
| UTRC LB 183, $Al_2O_3$ in fused silica + 5% Pyrex + 25% BN | 0.42 | 8 |

*In similar tests some samples lasted as long as 15 seconds
**In similar tests some samples lasted as long as 10 seconds

TABLE X

Biaxial Samples for Laser Tests

| Sample* | No. of Layers | Class Added Between Layers gms | Thickness cm | Weight gms | Density gms/cm$^3$ | Remarks |
|---|---|---|---|---|---|---|
| LB351 | 82 | none | 0.953 | 86.55 | 2.782 | Tested at UTRC |
| LB352 | 102 | none | 0.941 | 88.24 | 2.954 | Tested at UTRC |
| LB353 | 112 | 0.172 | 1.041 | 97.21 | 2.858 | Sent to AFML |
| LB354 | 104 | 0.044 | 0.900 | 88.35 | 3.017 | " |
| LB355 | 104 | 0.049 | 0.864 | 84.20 | 2.985 | " |
| LB356 | 104 | 0.126 | 1.034 | 97.58 | 2.883 | cracked |
| LB357 | 104 | 0.118 | 1.000 | 90.58 | 2.778 | Sent to AFML |
| LB358 | 104 | 0.219 | 1.041 | 93.85 | 2.759 | Crazed, sent to AFML |

*All Samples Hot Pressed at 2000 psi and 1350° C.

TABLE XI
Effect of 10.6 Laser Irradiation* on Alumina Fiber Reinforced Fused Silica Composites

| Specimen | Density gms/cm³ | Height gms | Thickness cm | Exposure Time secs | Linear Recession Rate cm/sec | Rate of Weight Loss gm/sec | Specimen Area cm² |
|---|---|---|---|---|---|---|---|
| LB349 | 2.710 | 53.144 | 1.61 | 80 | 0.012 | 0.087 | 10.1 |
| LB351 | 2.782 | 86.540 | 0.953 | 13 | 0.042 | 0.107 | 32.7 |
| LB352 | 2.954 | 88.235 | 0.914 | 9 | 0.045 | 0.094 | 32.7 |

*All tests carried out with high intensity flat topped beam, UTRC twelve tube laser As is evident from table IX, all samples were found to perform satisfactorily; the smaller area sled sample (10.1 cm²) which permitted heat loss through the edge showed a much lower linear recession rate and slightly less weight loss per second. The larger area samples, LB 351 and 352, showed nearly identical linear recession rates and weight losses. All three samples cracked on rapid cooling as the laser beam was abruptly turned off and heating ceased, but all three samples still had good structural integrity.

From an examination of the aforementioned, it can be seen that the present invention provides a structural material of superior strength and temperature stability in addition to high resistance to the degradative effects induced by lasers. It should be understood, however, that while the specific composites described herein illustrate preferred embodiments of the invention, various modifications and alterations can be made without departing from the spirit and scope thereof and that all said modifications as fall within the scope of the appended claims are intended to be included herein.

What is claimed is:

1. A method for fabricating a biaxially oriented fiber reinforced, ceramic composite which comprises the steps of:
    a. pulling a tow of alumina having a multitude of fibers in parallel relationship to one another through an agitated organic slurry containing a suspension of finely divided glass particles comprising about 95% by weight fused silica glass and about 5% by weight borosilicate glass in order to impregnate said tow;
    b. drying and cutting said impregnated tow into a sheet of predetermined shape;
    c. placing layers of said sheet into a metal die such that the parallel fibers of any one sheet are laid at right angles to the parallel fibers of any adjoining sheet therefore forming a 0°, 90° biaxially oriented structure; and
    d. hot pressing said layers at a temperature and pressure sufficient to form said reinforced ceramic composite.

2. A method in accordance with claim 1 wherein said glass slurry contains a solvent mixture of isopropyl alcohol and polyvinyl alcohol.

3. A method in accordance with claim 2 wherein said biaxially oriented structure is hot pressed for about one hour at a temperature of from about 1000° to 1400° C. and a pressure of from about 1000 to 4000 psi.

4. A method in accordance with claim 3 wherein said biaxially oriented structure is hot pressed for about one hour at a temperature of from about 1300° to 1350° C. and at a pressure of about 2000 psi.

5. A hot pressed, biaxially oriented, alumina fiber reinforced ceramic composite comprising at least a first and second series of alumina fibers, wherein
    a. said first series of alumina fibers are oriented in a parallel relationship to one another along a predetermined direction;
    b. said second series of alumina fibers are juxtapositioned to said first series of fibers and are oriented in a parallel relationship to one another along a direction at right angles to that direction of said first series of fibers; and
    c. a ceramic impregnant comprising about 95% by weight fused silica glass and about 5% by weight borosilicate glass permeating the interstices of said first and second series of fibers.

6. A hot pressed, biaxially oriented, alumina fiber reinforced ceramic composite in accordance with claim 5 further comprising a plurality of said first and second series of alumina fibers.

7. A hot pressed, biaxially oriented, alumina fiber reinforced ceramic composite in accordance with claim 5 wherein said alumina fibers comprise about 50 volume percent of said composite.

* * * * *